United States Patent
Khurana et al.

(10) Patent No.: US 7,770,055 B2
(45) Date of Patent: *Aug. 3, 2010

(54) FAST SOFTWARE FAULT DETECTION AND NOTIFICATION TO A BACKUP UNIT

(75) Inventors: Neeraj Khurana, Sunnyvale, CA (US); Alain Jebara, Milpitas, CA (US); Neil Joffe, Mountain View, CA (US); Venkatram Krishnamoorthi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/336,323

(22) Filed: Dec. 16, 2008

(65) Prior Publication Data

US 2009/0100288 A1    Apr. 16, 2009

Related U.S. Application Data

(63) Continuation of application No. 10/723,234, filed on Nov. 26, 2003, now Pat. No. 7,467,321.

(51) Int. Cl.
    *G06F 11/00* (2006.01)
(52) U.S. Cl. ............................ 714/4; 714/11; 714/13; 714/30; 714/43; 714/48
(58) Field of Classification Search .................... 714/4, 714/11, 13, 30, 43, 48
    See application file for complete search history.

(56) References Cited

U.S. PATENT DOCUMENTS 6,795,933 B2   9/2004   Wachel
6,880,086 B2   4/2005   Kidder et al.
6,883,110 B1   4/2005   Goddard
6,883,170 B1   4/2005   Garcia
7,058,007 B1   6/2006   Daruwalla et al.
2002/0066110 A1   5/2002   Cloonan et al.

(Continued)

OTHER PUBLICATIONS

White Papers from the files of Networking Unlimited, Inc. ; From: Networking Unlimited Website; Copyright 1999-2002; pp. 1-4.

(Continued)

*Primary Examiner*—Robert Beausoliel
*Assistant Examiner*—Joseph D Manoskey
(74) *Attorney, Agent, or Firm*—Marger Johnson & McCollom, P.C.

(57) ABSTRACT

A method and system for quickly informing a backup unit that a primary unit has failed. Normally an exception handler is activated when a software failure occurs and network controller chips or the ASIC interface to a signal bus can operate even though there is a software failure. A software failure notification packet is programmed and stored in a location that is not affected by a software system failure. When a software failure occurs, control is shifted to the exception handler. The exception handler sends a pre-established and pre-addressed packet to the network controller card which transmits this packet to the backup unit. Upon receipt of the packet, the backup unit goes into operation. In some alternate embodiments that include multiple line cards in a single unit, the exception handler sends a signal to a backup unit via a signal bus or a data bus.

20 Claims, 4 Drawing Sheets

U.S. PATENT DOCUMENTS

2004/0034871 A1    2/2004    Lu et al.
2004/0105388 A1*    6/2004    Wilkins et al. .............. 370/235

OTHER PUBLICATIONS

X.25 Remote Failure Detection; Cisco Systems, Inc. Posted Apr. 22, 2004; Copyright 1992-2004; pp. 1-9.

Using Dial-on-Demand Routing to Trigger Backup Links on Cisco Routers; From: Networking Unlimited Website, Dr. Vincent C. Jones; Jun. 3, 2000; Copyright 1999, 2000; pp. 1-10.

Failure-Resistant Network Architecture; From: OneAccess Networks Website; Copyright 2004; pp. 1-2.

NSR™ Non-Stop Routing Technology; From AVICI Systems Website; Copyright 2002; pp. 1-8.

Router Redundancy with VRRP; Dell, Inc.; Feb. 2004; pp. 1-4.

* cited by examiner

FAST SOFTWARE FAULT DETECTION AND NOTIFICATION TO A BACKUP UNIT

CROSS-REFERENCE TO RELATED APPLICATIONS

The present application is a continuation of U.S. patent application Ser. No. 10/723,234, filed on Nov. 26, 2003.

FIELD OF THE INVENTION

The present invention relates to communication systems and more particularly to communication system that includes a redundant or back-up unit.

BACKGROUND OF THE INVENTION

Many modern communication networks include routers that inter-connect various paths in the network. Routers generally include tables which provide a map of routes through the network. The technology for routing messages through networks is well know. For example, see books such as *"Designing Routing and Switching Architectures"* Network Architecture and Development Series, by Howard C Berkowitz, Published by Que; 1st edition Nov. 15, 1999, ISBN: 1578700604 or *"OSPF Anatomy of An Internet Routing Protocol"* by John T. Moy, published by Addison-Wesley Pub. Co.; 1st edition, Jan. 15, 1998 ISBN: 0201634724.

Reliability is of primary importance in modern day communication systems. Reliability is often increased by the use of stand-by routers which are brought into operation when a primary router fails.

When a router becomes inoperable, a new map of the paths through the network must be calculated and propagated to all routers in the network. There are known protocols and techniques for doing this type of re-routing such as the "Link State Routing Protocol" or the "Distance-Vector Routing Protocol". Using these protocols, routers talk to adjacent routers, informing each other of what network routes are currently active.

Many different types of failures can occur in a system. However, one of the most common failures is a software failure. A software failure occurs when, for some reason, the software in a unit stops operating properly. In many systems when a software failure occurs, the system branches to an exception handler routine. The exception handler routine is an independent program thread of execution, that generally performs a number of operations that facilitate handling and post-mortem analysis. For example the exception handler may perform a memory dump so that programmers can determine what caused a software failure.

Communication systems that include backup routers, usually include a mechanism to detect software failures in the primary unit. When a software failure is detected by these mechanisms, operation of the backup unit is intiated. In currently available systems, there are a variety of different types of mechanisms for detecting failure and activating backup units.

Some systems include a hardware implemented mechanism for detecting software failure and for activating a backup router. A hardware failure detection mechanism may for example include a special signal line that activates a standby unit when a software failure occurs in a primary unit.

For systems that do not include a hardware failure detection mechanism, there are several known types of failure detection mechanisms in widespread use. One known type of software failure detection uses a simple time out mechanism. For example, a primary unit can be programmed to periodically send a signal to a standby unit (for example every 1 to 30 seconds). If the standby unit does not receive this signal within a defined period, it concludes that the primary unit has failed and the backup unit goes into operation. This type of failure detection is sometimes called a "heart-beat" method. Another type of known failure detection can be termed "hello-acknowledge". When a "hello-acknowledge" methodology is used, the backup unit (or a central unit) periodically polls the main unit. If a response is not received in a specified period, the system concludes that the primary unit is not operating.

With the known types of software failure detection mechanisms there can be a delay between when the failure occurs and when the backup unit detects the failure. For example with "heart-beat" systems, there is a period of time between heart beats. While this period of time may be quite short (i.e. 1 to 30 seconds) with a communication system, much data can be lost in short period of time.

The present invention is directed to a proactive software mechanism for detecting failure and for activating a backup unit.

SUMMARY OF THE PRESENT INVENTION

The present invention is directed to method and system for quickly informing a backup unit that a primary unit has failed. The present invention takes advantage of the fact that in computer systems, an exception handler is activated when a software failure occurs. Furthermore the invention takes advantage of the fact that certain components (for example the network controller chip, or the ASIC interface to a signal bus) can operate even though there is a software failure. In one embodiment of the invention, a software failure notification packet is programmed and stored in a location that is not affected by a software system failure. When a software failure occurs, as is normal, control is shifted to the exception handler. With the present invention, an augmented exception handler sends a pre-established and pre-addressed packet to the network controller card which transmits this packet to the backup unit. Upon receipt of the packet, the backup unit goes into operation. In other embodiments, (where the primary unit and the backup unit are in the same physical box) the exception handler sends a signal to the backup unit via a signal bus or a data bus. Thus, with the present invention, a signal is sent to the backup unit as soon as a software failure occurs.

DETAILED DESCRIPTION

Several different embodiments of the invention will be described. It should, however, be understood that the invention is equally applicable to various other types of routers in addition to those shown in the embodiments specifically described herein. This invention may be embodied in many different forms and the scope of the invention is not limited to the embodiments specifically described herein.

In the first embodiments described herein, the invention is applied in a Cable Modem Termination System (hereinafter referred to as a CMTS). CMTS units are normal parts of cable networks. CMTS units are, for example, often part of the systems used by cable system operators to offer high-speed Internet access to home computers. Such systems generally include "cable modems" at the user premises and a CMTS unit located at the cable head-end. The CMTS unit receives signals sent upstream from the cable modems. The signals received by the CMTS are converted into IP packets and routed to an Internet Service Provider for connection to the Internet. The CMTS also can receive IP packets from the Internet and send signals downstream to the user's cable modem. In general, cable modems cannot communicate directly with each other; they must communicate by channeling their signals through a CMTS.

Figure 1:
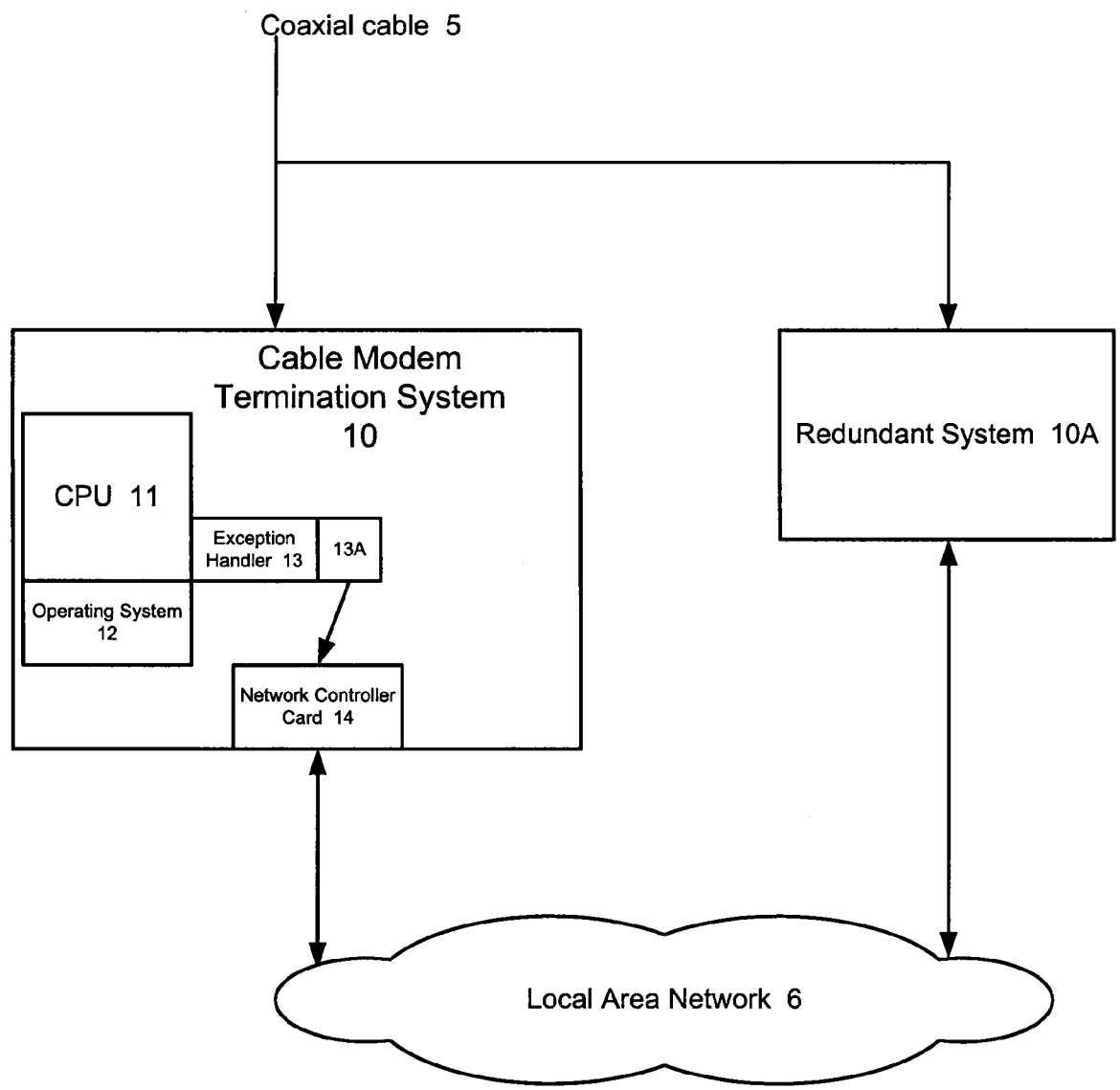
FIG. 1 is a block diagram of a first preferred embodiment.

In order to achieve high reliability, cable systems frequently include back-up CMTS units which become operable if a primary unit fails. A system including a back-up router is shown in FIG. 1. The system shown in FIG. 1 includes a CMTS 10 which provides an interface between coaxial cable 5 and local area network 6. The system includes a backup CMTS 10A which can be brought into operation if the CMTS 10 becomes inoperable.

The CMTS 10 includes a CPU 11, an operating system 12, an exception handler 13 and a network controller card 14. There are commercially available CMTS units that include s CPU, an operating system, an exception handler and network controller card. Such CMTS units are commercially available for a number of vendors such as Motorola Inc., Cisco Systems Inc., Juniper Networks Inc. etc. The CPU 11, the operating system 12, exception handler 13 and network controller card 14 can be the same as those in the commercially available units.

Network controller card 14 includes a Direct Memory Access (DMA) ring. This is the same as the DMA ring in commercially available network controller cards. Packets placed in the DMA ring of card 14 are sent out on the network 6, independent of whether or not the CPU 11 and the operating system 12 are operational.

The unit 10A is identical to the unit 10. The units 10 and 10A normally interact through network 6 in order to update routing tables and other aspects of the system. Router 10A includes programming which can receive a control packet from the local area network 6, which instruct unit 10A to begin operating. Controlling the operation of a router in response to control packets is conventional.

The software operating system 12 is a very complex set of interacting software programs. Operating systems for routers are well known and in commercial use, hence software operating system 12 is not described in detail herein. Such operating systems generally consist of a number of different planes of software which together control the router and perform the various routing function. In general, an operating system in a router is the primary software that runs on the CPU which is a part of the router hardware platform. The operating system drives, controls, manages and coordinates the hardware and software applications that are needed by a user on that given platform. It also supports execution of software applications and their coordination. It achieves this with the help of device drivers, process scheduler, and various other software libraries.

An example of a commercially available operating system for an Internet router is the operating system marketed under the trademark Cisco IOS™. The Cisco IOS program includes an operating system and various other software needed to enable data-networking on various hardware platforms marketed by the Cisco corporation. The IOS data-networking software also has support for various defined layers, such as layer 2 to layer 7, where layer 2 is implemented in drivers, layer 3 in IP, etc, layer 4 in TCP, UDP, RTP, etc. and so on. Thus, the operating system 12 is a very complicated piece of software that has many layers of programming which interact to provide a variety of functions.

Since units are commercially available that include CPU 11, an operating system 12 and a network controller card 14, no further detailed explanation will be given of the details these units.

With respect to the present invention, operating system 12 (which could for example be the Cisco IOS) provides a mechanism to handle various software faults like bad memory accesses, CPU instruction execution errors, etc. These faults generate an exception signal that is sent to the exception handler 13. That is, as is customary in this type of system, when an error or fault occurs in the operating system 12, the exception handler routine 13 is activated. The normal purpose of this routine is to dump (i.e. preserve) the data in memory and in various registers, so that the cause of the failure can be diagnosed later.

The present invention adds a relatively small amount of code to the exception handler 13. In FIG. 1 this additional code is designated 13A. When exception handler 13 is activated, the code 13A sends a pre-established packet to network controller card 14. The packet is placed in the DMA ring of controller card 14. As previously explained the network controller card 14 is a separate hardware device that remains functional even when a fault occurs in the operating system 12. Thus, network controller card 14 can transmit the special packet provided by code 13A even though the operating system 12 has stopped functioning.

Exception handler extension 13A includes a pre-established pre-formatted control packet, stored in a memory location that is not affected by an operating system crash. This pre-established control packet has appropriate addressing and control information stored therein. The addressing is such that this packet is directed to unit 10A. The control information in this packet instructs unit 10A to begin operating. When program 13A is activated it retrieves this pre-established packet and places it directly in the DMA ring of Network controller card 14. Network Controller card 14 then transmits this packet on network 6 and it is delivered to system 10A. The control packet (sent by code 13A via network card 14) instructs unit 10A to begin functioning.

It is noted that when the system is crashing, that is, when a software fault or crash occurs, the CPU and/or the software layers can not be assumed to be available to deliver packets to the standby router in the normal manner. However, as is conventional the network controller chip 14 runs independent of the CPU and it is fully functional and available during a software crash. Thus the CPU exception handler extension 13A directly places the crash notification packet into the DMA ring of the network controller 14. The network controller card 14 can then reliably deliver the crash notification packet onto the network and thus to the standby router.

Systems that send control packets between units are known. Such packets contain an address and a control code which the unit receiving the packet recognizes as a control code and thus takes the action designated by the particular control code. In the embodiment shown the control packet contains the network address of redundant system 10A and a control code that causes unit 10A to begin operating.

Using the technique described herein, the redundant system 10A is notified almost immediately that unit 10 has stopped functioning. There is no need to wait until a timeout occurs as is the situation with the software detection systems known in the prior art.

It is noted that while in the embodiment shown in FIG. 1, the units are interconnected by a local area network. In other units the interconnection could be by a wide area network or WAN such as the commercial Internet network.

Figure 2:
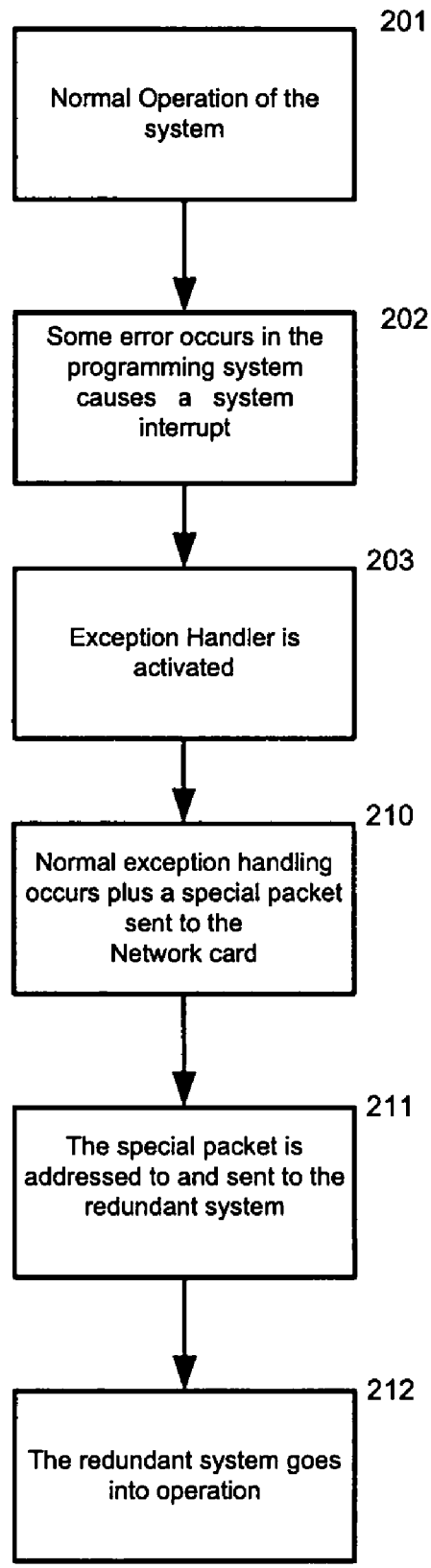
FIG. 2 is a block flow diagram showing the operation of the system shown in FIG. 1.

FIG. 2 is block flow diagram which illustrates the operation of the system shown in FIG. 1. Block 201 represents the normal operation of the system. This is where the flow diagram in FIG. 2 starts. As indicated by blocks 202 and 203, the fault notification process begins when an error occurs in the operating system 12, causing a branch to the exception handler 13. As indicated by block 210, program 13A sends a control packet directly to the network controller card 14. This packet is preset and stored in a particular memory location, such that none of the packet assembly routines in operating system 12 are utilized. The packet is transmitted to system 10A by network controller card 14, and the backup system 10A them begins operating on signals from coaxial cable 5.

Figure 3:
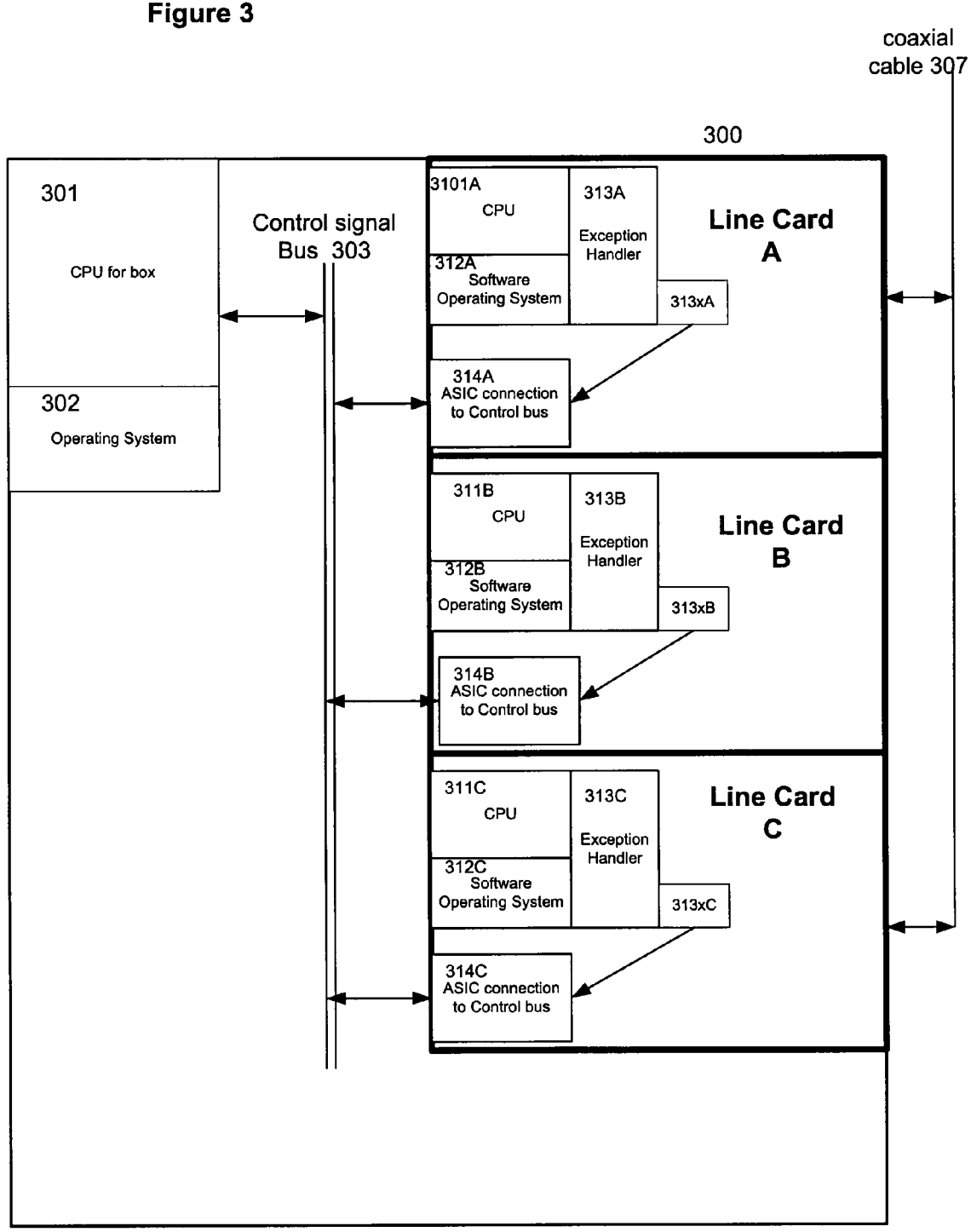
FIG. 3 is a block diagram of a second embodiment of the invention.

An alternate embodiment of the invention is shown in FIG. 3. In this alternate embodiment, the router unit 300 includes a number of what are conventionally known as "line cards". The line cards in unit 300 are designated A, B, and C. One of the cards, (that is, the card designated C) is a backup card that only operates if one of the other cards stops operating for some reason. It is noted that while only three line cards are shown, the system could have many such cards. Systems that have a number of line cards are commercially available. Examples of such commercially available systems are the "ubr7200" and "ubr10000" series of routers marketed by the Cisco corporation. These routers utilize the Cisco's IOS operating system software.

Each of the line cards include a CPU 311, a software operating system 312, and exception handler 313 and an ASIC 314 that is connected to a control bus 303 as is conventional. The system 300 also includes a CPU 301 and a box operating system 302 as is conventional. The control signal bus 303 can, for example be the PCI bus of CPU 301. The system 300 may also include a data bus that interconnects the cards and various other components that are not particularly relevant to the present invention, hence, they are not shown.

In the embodiment shown in FIG. 3 each line card includes an extension 313x to the exception handler code 313. This extension is similar to the extension 13A shown in FIG. 1.

During normal operation of the system, line card A handles signals from coaxial cable 307. It is noted that coaxial cable 307 is also connected to card C, so that if card A become inoperable, the signals on coaxial cable 307 can be handled by card C. Other coaxial cables not shown would be connected to the other line cards.

The operation of card A will now be discussed. It should be understood that the other cards operate in a similar manner. If software operating system 312A is for some reason disabled due to a fault, the exception handler 313A is activated in a normal manner. When exception handler 313A is activated programming code 313X is activated. Program 313x sends a signal to ASIC 314A. ASIC 314 sends this signal out on bus 303 to card C informing card C that it should begin operating.

The notification of card C occurs almost immediately when the fault occurs. There is no waiting for a time out to occur.

Figure 4:
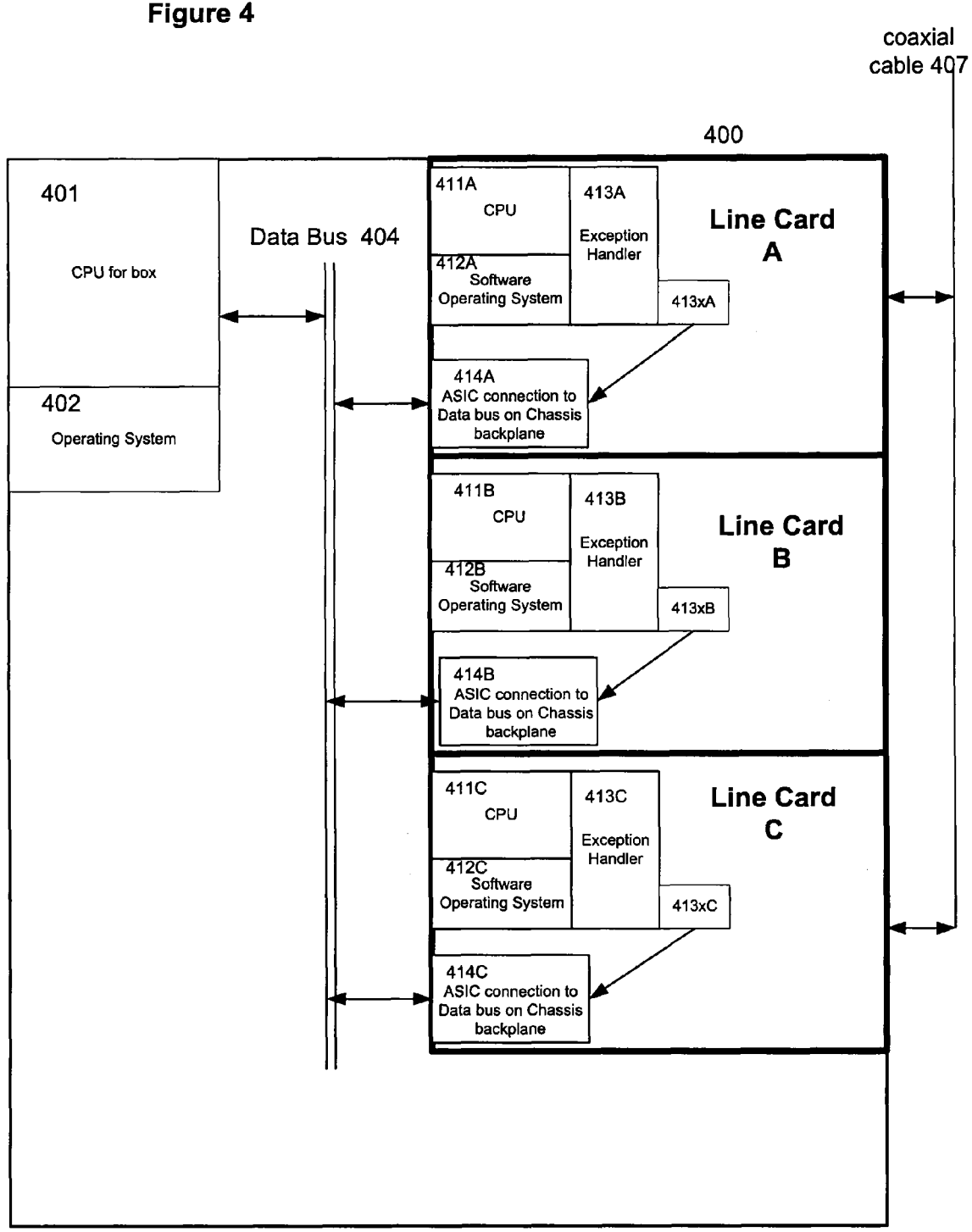
FIG. 4 is a block diagram of a third embodiment of the invention.

FIG. 4 shows still another alternate embodiment. In the embodiment shown in FIG. 4, the line cards including the CPU 411, the operating system 412, the exception handler 413 and the extension to the extension 413x are similar to the corresponding components in the previously described embodiments.

In the embodiment shown in FIG. 4, there is no control bus that connects the line cards. Thus, control signals can not be sent directly between the line cards. The system does however, have a data bus 404 that can transmit packets between the cards. Is the system shown in FIG. 4, a control packet is sent from a failing line card to the backup line card, similar to the operation of the first embodiment of the invention, with the exception that the packet transmission is entirely within one box or unit.

In this embodiment, the data forwarding plane 404, which is part of a conventional Network Processing unit (NPU) is used to exchange control traffic. In this type of architecture, traffic that the NPU cannot handle is diverted to the CPU. This fact is leveraged for crash notification. The extension to the exception handler injects a pre-created crash notification packet into the data plane stream. The forwarding plane of the NPU on the standby unit diverts this notification to the standby CPU, thus enabling fault detection and notification without interrupt support or network controller support.

The three embodiments of the invention discussed above can be summarized as follows: In the first embodiment, there is an independent standby unit connected to the primary unit by a local area network. When a software crash or a software fault occurs in the primary unit, an extension to the exception handler in the primary unit sends a pre-created crash notification packet to the standby unit. It is noted that since the system is crashing, the CPU and the software layers are not available to deliver the packet to the standby router in the normal manner. However, the network controller chip runs independent of the CPU and it is fully functional and available during a software crash. Thus the CPU exception handler extension directly places the pre-established crash notification packet into the DMA ring of the network controller which then reliably delivers the crash notification packet onto the network and thus to the standby router.

In the second embodiment, there is not an independent control network interface that is available to deliver a crash notification packet to the backup unit. In this embodiment, the exception handler extension sends a control signal to the backup unit via a signal bus which interconnects the units.

In the third embodiment, traffic that a network processing unit can not handle is diverted to a CPU data bus. In this embodiment, a pre-created crash notification packet is embedded into the data plane stream. The forwarding plane network processing unit diverts this notification to the standby CPU, thus enabling software fault notification without interrupt support or network controller support.

In each of the embodiments, the backup unit is notified of a software fault without waiting for any time out or heart beat mechanism to operate.

While the invention has been shown with respect to a number of different embodiment, it should be understood that various changes in form and detail can be made without departing from the spirit and scope of the invention. The scope of the invention is only limited by the appended claims.

We claim:

1. A computer-implemented method, comprising:
    activating a notification program in response to an activation of an exception handler, wherein the activation of the exception handler is in response to a first unit suffering a software fault, the first unit comprising the exception handler and an operating system; and
    using the notification program, sending a control packet to a backup unit without using the operating system.

2. The computer-implemented method of claim 1, wherein the exception handler comprises the notification program.

3. The computer-implemented method of claim 1, further comprising activating the backup unit in response to the backup unit receiving the control packet.

4. The computer-implemented method of claim 1, wherein the software fault occurs in the operating system.

5. The computer-implemented method of claim 1, wherein sending the control packet to the backup unit comprises sending the control packet to a network controller card.

6. The computer-implemented method of claim 5, wherein sending the control packet to the backup unit further comprises placing the control packet in a DMA ring of the network controller card.

7. The computer-implemented method of claim 5, wherein sending the control packet to the backup unit further comprises, using the network controller card, transmitting the control packet to the backup unit.

8. The computer-implemented method of claim 5, wherein the first unit further comprises the network controller card.

9. The computer-implemented method of claim 1, wherein sending the control packet to the backup unit is performed immediately upon the first unit suffering the software fault.

10. One or more computer-readable media storing computer-executable instructions that, when executed by a processor, are operable to perform the computer-implemented method of claim 1.

11. A computer-implemented method, comprising:
responsive to an activation of an exception handler of a first line card, wherein the activation of the exception handler is responsive to the first line card becoming inoperable, activating programming code; and
using the programming code, notifying a backup line card that the first line card has become inoperable.

12. The computer-implemented method of claim 11, wherein notifying the backup line card comprises sending a signal to an ASIC connected to a control signal bus.

13. The computer-implemented method of claim 12, wherein notifying the backup line card further comprises sending the signal from the ASIC to the backup line card via the control signal bus.

14. The computer-implemented method of claim 13, further comprising instructing the backup line card to begin operating responsive to receiving the signal from the ASIC.

15. One or more computer-readable media storing computer-executable instructions that, when executed by a processor, are operable to perform the computer-implemented method of claim 11.

16. A computer-implemented method, comprising:
responsive to a first line card failing, wherein the first line card comprises an exception handler, activating an exception handler;
responsive to activating the exception handler, wherein the exception handler comprises an exception handler extension, activating the exception handler extension; and
sending a control packet from the exception handler extension to a second line card.

17. The computer-implemented method of claim 16, wherein sending the control packet to the second line card comprises sending the control packet on a data bus.

18. The computer-implemented method of claim 16, further comprising activating the second line card responsive to receiving the control packet from the exception handler extension.

19. The computer-implemented method of claim 16, wherein sending the control packet comprises injecting the control packet into a data plane stream, the control packet comprising a pre-created crash notification packet.

20. The computer-implemented method of claim 19, wherein sending the control packet further comprises diverting the pre-created crash notification packet from the data plane stream to the second line card without interrupt support or network controller support.

* * * * *